(12) United States Patent
Rajurkar et al.

(10) Patent No.: US 8,879,678 B1
(45) Date of Patent: Nov. 4, 2014

(54) METHOD AND APPARATUS FOR CONTROLLING FINGER LOCK STATE IN A RAKE RECEIVER

(71) Applicant: Qualcomm Incorporated, San Diego, CA (US)

(72) Inventors: Anand Rajurkar, Hyderabad (IN); Bhaskara Viswanadham Batchu, Ameenpur Village (IN); Rashid Ahmed Akbar Attar, San Diego, CA (US); Rajkumar Kamaraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/010,252

(22) Filed: Aug. 26, 2013

(51) Int. Cl.
  *H04B 7/08* (2006.01)
  *H04B 1/7117* (2011.01)
  *H04W 52/02* (2009.01)

(52) U.S. Cl.
  CPC ......... *H04W 52/0251* (2013.01); *H04B 1/7117* (2013.01)
  USPC .......................................... 375/347

(58) Field of Classification Search
  USPC .................................. 375/347, 267
  See application file for complete search history.

(56) References Cited

U.S. PATENT DOCUMENTS

| | | | |
|---|---|---|---|
| 6,674,793 B2 * | 1/2004 | Smolyar et al. | 375/150 |
| 7,630,427 B2 | 12/2009 | Banister et al. | |
| 2003/0235239 A1 * | 12/2003 | Li et al. | 375/148 |
| 2008/0310485 A1 | 12/2008 | Soliman et al. | |
| 2011/0200075 A1 * | 8/2011 | Clevorn et al. | 375/148 |
| 2012/0155578 A1 | 6/2012 | Yang et al. | |
| 2012/0183033 A1 | 7/2012 | Allpress et al. | |

OTHER PUBLICATIONS

3GPP2 C.R1002-A, "cdma2000 Evaluation Methodology Revision A," 3rd Generation Partnership Project 2 "3GPP2" Version 1.0, May 11, 2009, pp. 1-238.

* cited by examiner

*Primary Examiner* — Kevin Kim
(74) *Attorney, Agent, or Firm* — Loza & Loza LLP

(57) ABSTRACT

Aspects of the disclosure provide methods and apparatuses for improving current 1x triage algorithm for assigning and de-assigning fingers of a Rake receiver included in a wireless communications apparatus operable in the 1x network. Other aspects, embodiments, and features are also claimed and described.

40 Claims, 11 Drawing Sheets

METHOD AND APPARATUS FOR CONTROLLING FINGER LOCK STATE IN A RAKE RECEIVER

TECHNICAL FIELD

The technology discussed below relates generally to wireless communication systems, and more particularly, to a triage algorithm operable at a Rake receiver for wireless communications.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the IS-2000 1x network (1xRTT), which belongs to the CDMA2000 standard supported by the 3rd Generation Partnership Project 2 (3GPP2) group. Another multiple access networks is the UMTS Terrestrial Radio Access Network (UTRAN). CDMA2000 1xEV-DO, also referred to as EV-DO or EV, uses multiplexing techniques including code division multiple access (CDMA) as well as time division multiple access (TDMA) to maximize both individual user's throughput and the overall system throughput. It is standardized by 3GPP2 as part of the CDMA2000 family of standards.

As the demand for mobile broadband access continues to increase, research and development continue to advance the CDMA2000 technologies not only to meet the growing demand for mobile broadband access, but to advance and enhance the user experience with mobile communications. For example, it is desirable to improve current 1x triage algorithm for assigning and de-assigning fingers of a Rake receiver included in a wireless communications apparatus operable in the 1x network. Improving the triage algorithm can lead to reduced power consumption at the apparatus.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure provide methods and apparatuses for improving current 1x triage algorithm for assigning and de-assigning fingers of a Rake receiver included in a wireless communications apparatus operable in the 1x network, such that power consumption at the apparatus can be reduced.

In one aspect of the disclosure, the disclosure provides a method of wireless communications operable at a mobile station (MS). The MS receives a signal at an active finger of a Rake receiver, and dynamically adjust a first threshold for assigning a non-active finger of the Rake receiver to a signal path, in accordance with a detected signal strength of the signal received at the active finger. For dynamically adjusting the first threshold, the MS increases the first threshold by an amount based on a number of strongest signal paths detected by the Rake receiver, each of the strongest signal paths having a detected signal strength equal to or greater than an assignment threshold.

Another aspect of the disclosure provides an apparatus that includes a Rake receiver and means for dynamically adjusting a first threshold for assigning a non-active finger of the Rake receiver to a signal path, in accordance with a detected signal strength of a signal received at an active finger of the Rake receiver. The means for dynamically adjusting includes means for increasing the first threshold by an amount based on a number of strongest signal paths detected by the Rake receiver, each of the strongest signal paths having a detected signal strength equal to or greater than an assignment threshold.

Another aspect of the disclosure provides a computer program product including a computer-readable medium. The medium includes code for: receiving a signal at an active finger of a Rake receiver; and dynamically adjusting a first threshold for assigning a non-active finger of the Rake receiver to a signal path, in accordance with a detected signal strength of the signal received at the active finger of the Rake receiver. For dynamically adjusting the first threshold, the first threshold is increased by an amount based on a number of strongest signal paths detected by the Rake receiver, each of the strongest signal paths having a detected signal strength equal to or greater than an assignment threshold.

Another aspect of the disclosure provides an apparatus that includes: at least one processor; a communication interface coupled to the at least one processor, the communication interface including a Rake receiver; and a memory coupled to the at least one processor. The at least one processor is configured to: receive a signal at an active finger of the Rake receiver; and dynamically adjust a first threshold for assigning a non-active finger of the Rake receiver to a signal path, in accordance with a detected signal strength of the signal received at the active finger of the Rake receiver. For dynamically adjusting the first threshold, The at least one processor is configured to increase the first threshold by an amount based on a number of strongest signal paths detected by the Rake receiver, each of the strongest signal paths having a detected signal strength equal to or greater than an assignment threshold.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
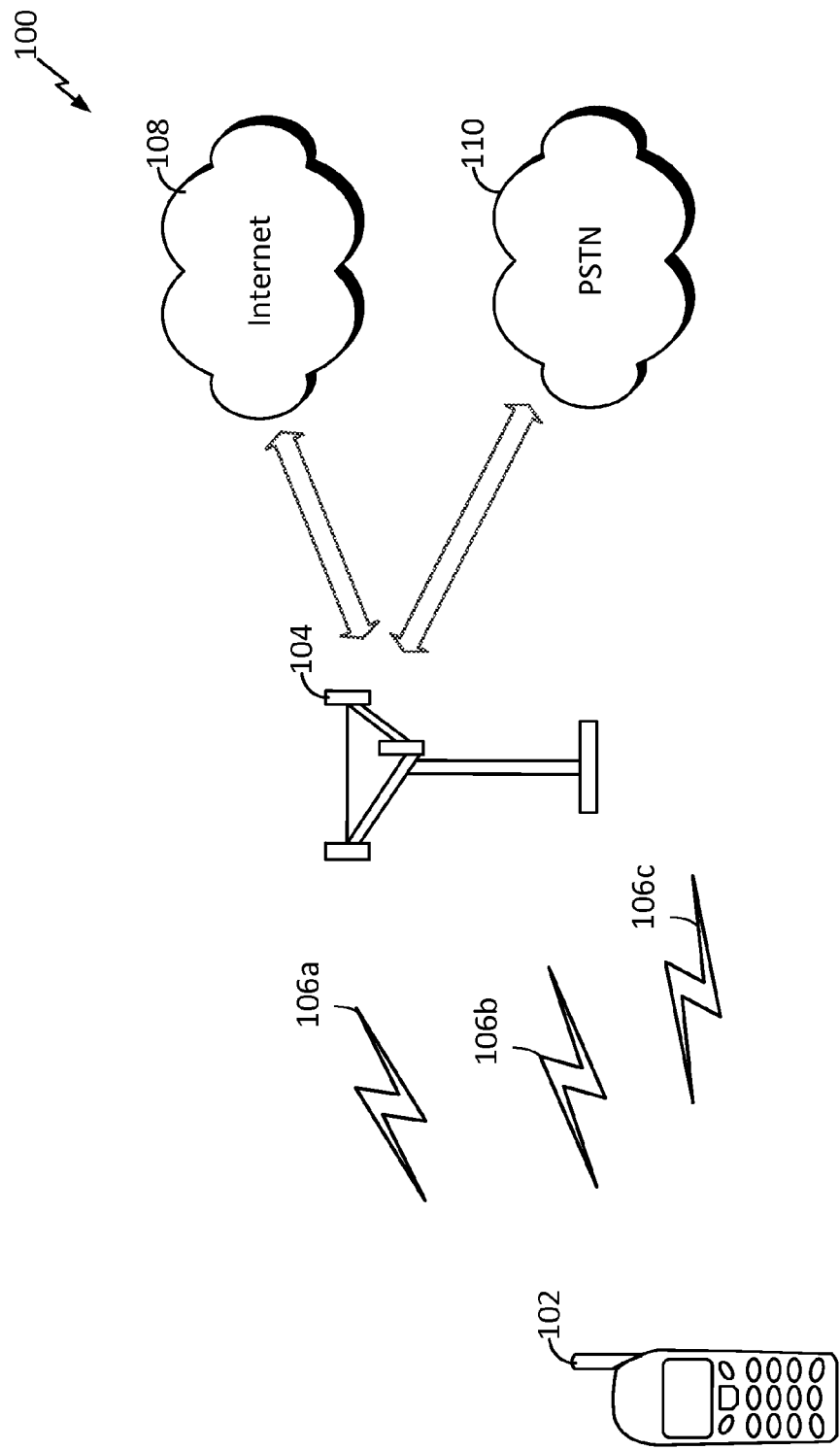
FIG. 1 is a conceptual diagram illustrating an IS-2000 1x communications system.

FIG. 1 is a conceptual diagram illustrating an IS-2000 1x communications system 100. A mobile station (MS) 102 (also known as an access terminal or user equipment) can wirelessly communicate with a base station (BS) 104 (e.g., a base transceiver system). While FIG. 1 only shows one BS 104, the system 100 may include a number of BSs 104 each providing network access in one of a number of partially overlapping geographic areas in which the MS 102 may be located. The MS 102 may access an IP network 108 (e.g., Internet) or a circuit-switched network 110 (e.g., PSTN) via the BS 104. In general, the wireless links between the MS 102 and the BS 104 involve multipath propagation that are illustrated as paths 106a, 106b, and 106c, which may arrive at the MS/BS at different time. Due to the different arrival time of the signals, the receiver of the MS/BS may experience signal cancellation or fading. Multipath propagation can be caused by natural obstacles such as buildings, hills, and so on. In various aspects of the disclosure, the MS 102 and/or BS 104 may be provided with a Rake receiver to mitigate the problems caused by multipath propagation. The Rake receiver of the present disclosure will be described in more detail below.

Figure 2:
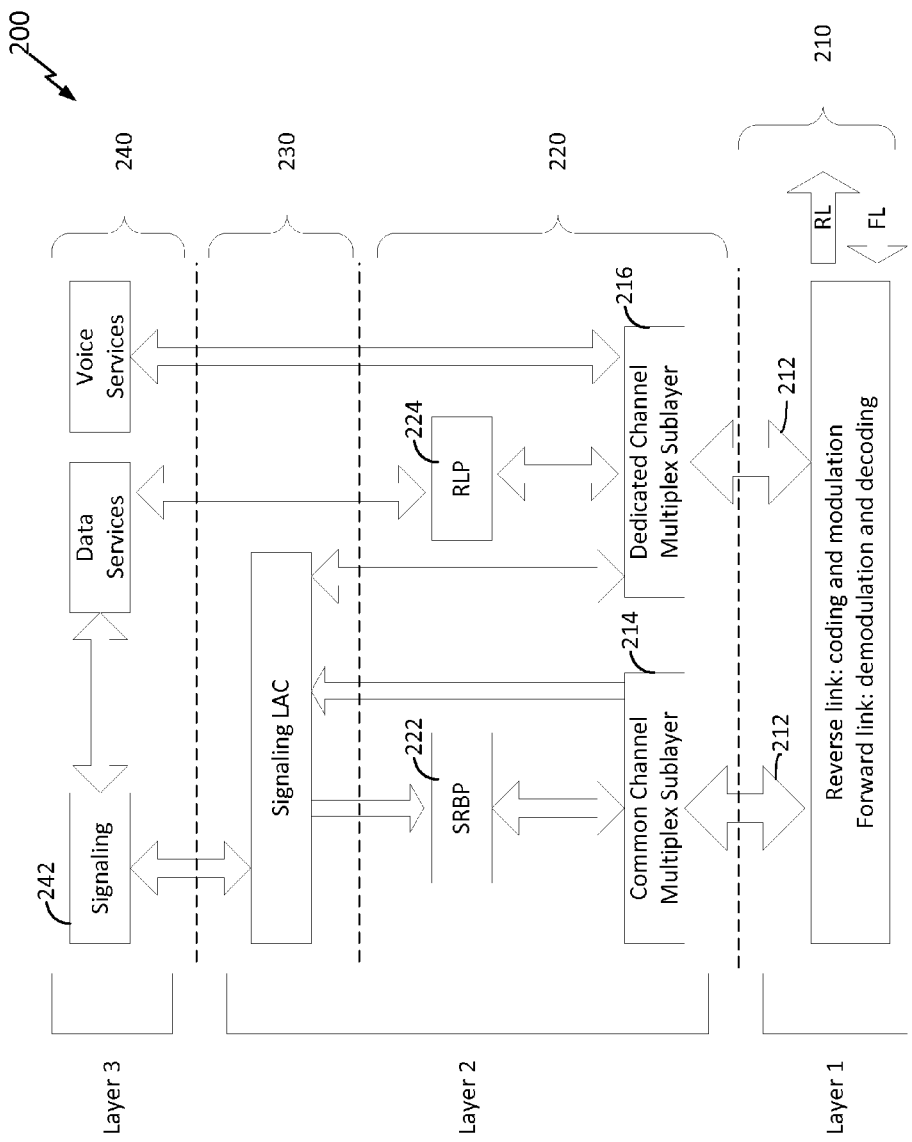
FIG. 2 is a diagram illustrating the structure of a protocol architecture in the IS-2000 1x standard from the perspective of a mobile station.

FIG. 2 shows the structure of a protocol architecture 200 used in IS-2000 from the perspective of a mobile station (e.g., MS 102). The protocol is divided into three different layers (layer 1, 2, and 3). These layers include a physical layer 210 (layer 1), a medium access control (MAC) sublayer 220 (layer 2), a signaling link access control (LAC) sublayer 230 (layer 2), and an upper layer 240 (layer 3).

The physical layer 210 is responsible for transmitting (RL) and receiving (FL) bits over a physical medium (e.g., over the air). For example, this layer may convert bits into waveforms with suitable modulation to enable their transmission wirelessly via a suitable air interface. The physical channels 212 are the communication paths between the physical layer 210 and the common/dedicated channel multiplex sublayers (214/216).

The MAC sublayer 220 controls higher layers' access to the physical medium that is shared among different users. In IS-2000, the MAC sublayer 220 manages the access of different users to the shared air interface. The logical channels are the communication paths between the common/dedicated channel multiplex sublayers (214/216) and the higher layer entities. The MAC sublayer 220 includes four different entities: SRBP 222, RLP 224, common channel multiplex sublayer 214, and dedicated channel multiplex sublayer 216. The common channel multiplex sublayer 214 performs the mapping between the logical common channels (channels that are shared among multiple users) and the physical common channels. The dedicated channel multiplex sublayer 216 performs the mapping between the logical dedicated channels (channels that are dedicated to specific users) and the physical dedicated channels. The SRBP entity 222 handles common-channel signaling (as opposed to dedicated-channel signaling) and the RLP entity 224 handles user information that is packetized in nature.

The signaling LAC sublayer 230 is responsible for the reliability of signaling (or overhead) messages that are exchanged. The LAC sublayer 230 performs a set of functions that ensure the reliable delivery of signaling messages. The upper layer 240 carries out overall control of the IS-2000 system such as processing all and originating new signaling messages. The signaling entity 242 (layer 3) controls the operation of the entire IS-2000 system. For example, the signaling entity 242 controls and executes functions that are used for the setup, maintenance, and tear down of a call following state transitions defined in the IS-2000 standard.

Figure 3:
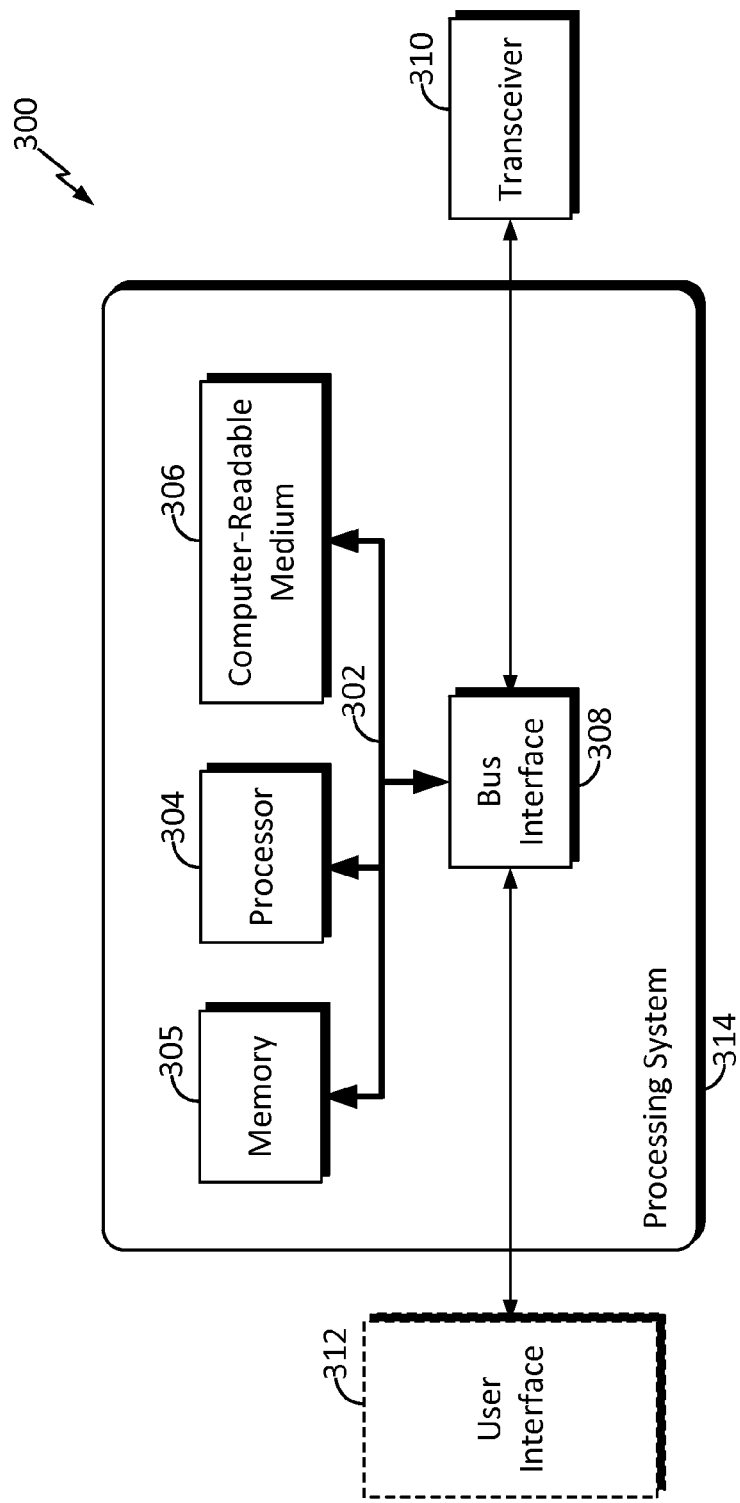
FIG. 3 is a conceptual diagram illustrating an example of a hardware implementation for an apparatus employing a processing system in accordance with some embodiments.

FIG. 3 is a conceptual diagram illustrating an example of a hardware implementation for an apparatus 300 employing a processing system 314. In accordance with various aspects of the disclosure, an element, or any portion of an element, or any combination of elements may be implemented with a processing system 314 that includes one or more processors 304. In various aspects of the disclosure, the MS 102 or BS 104 may be implemented with the apparatus 300. Examples of the processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium (e.g., a wireless communication medium). In various aspects of the disclosure, the transceiver 310 may include RF front ends and one or more Rake receivers that will be described in more detail below. Depending upon the nature of the apparatus, a user interface 312 (e.g., keypad, touchscreen, display, speaker, microphone, joystick, mouse, touchpad, camera) may also be provided.

The processor 304 is responsible for managing the bus 302 and general processing, including the execution of software stored on the computer-readable medium 306. The software, when executed by the processor 304, causes the processing system 314 to perform the various functions described infra for any particular apparatus. The computer-readable medium 306 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
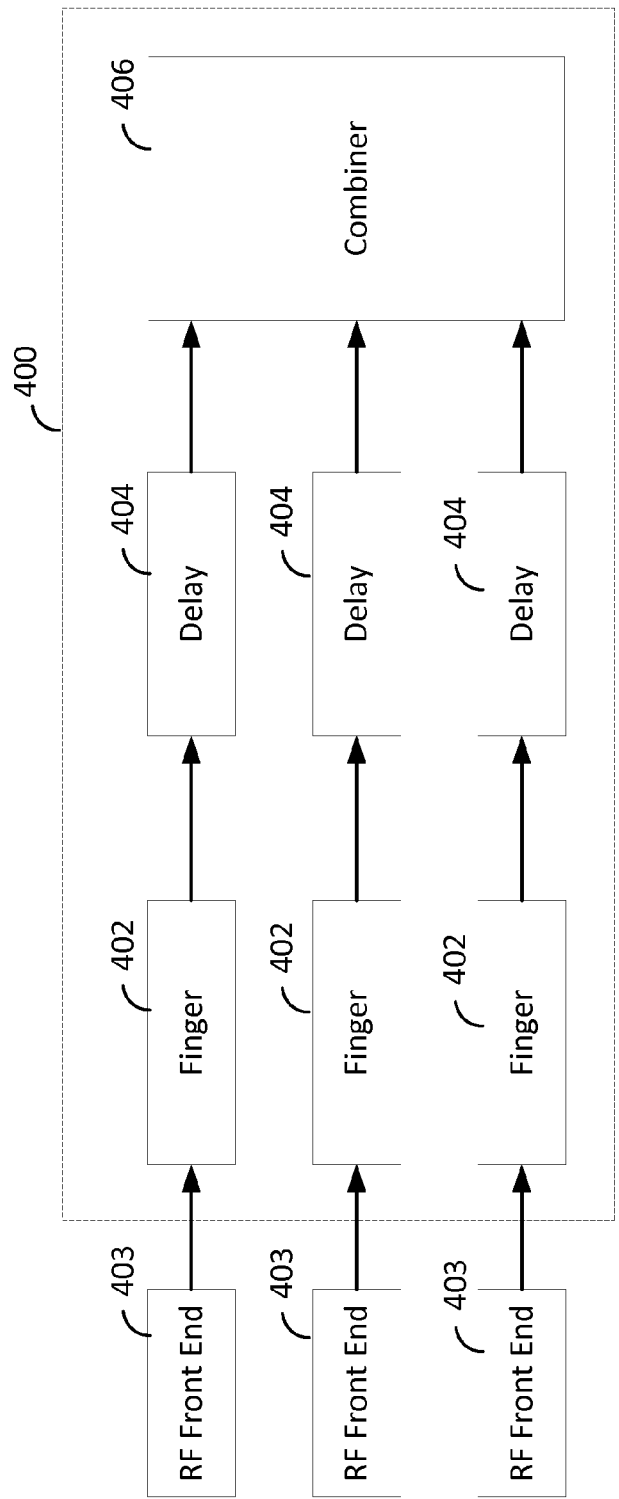
FIG. 4 is a simplified block diagram illustrating a Rake receiver that can be included in a transceiver of FIG. 3 in accordance with some embodiments.

FIG. 4 is a simplified block diagram illustrating a Rake receiver 400 that can be included in a transceiver. In one aspect of the disclosure, the Rake receiver 400 may be included in the transceiver 310. The Rake receiver 400 is a radio receiver designed to counter the undesirable effects of multipath propagation. The Rake receiver 400 includes several fingers 402 (e.g., correlators) each may be assigned to a different multipath component (e.g., paths 106a, 106b, 106c) received from a number of RF front ends 403. Only three fingers 402 and three RF front ends 403 are illustrated in FIG. 4. However, the Rake receiver 400 can have any suitable number of fingers. Each finger 402 independently decodes an assigned multipath component. The Rake receiver 400 also includes several delays 404 respectively connected to the fingers 402. The delays 404 compensate for the difference in the arrival times of the symbols at each finger 402. A Rake combiner 406 then sums the channel-compensated symbols, thereby providing multipath diversity against fading. The contribution of all fingers 402 are combined in order to make the most use of the different transmission characteristics of each transmission path.

In a conventional Rake receiver configured for 3GPP2 CDMA2000 1x communication, a "triage" algorithm is used to track the paths and assign fingers of the Rake receiver to detected signal energy. According to the conventional triage algorithm, the threshold signal energy at which a finger is assigned to a path is very low, and furthermore, there is no effective finger de-assignment logic in the typical triage algorithm. Moreover, the assignment of fingers based on instantaneous signal energies might lead to a false or undesirable assignment of fingers. Once assigned, the assigned fingers may remain active, even after they have been out of lock for an extended period of time. Accordingly, the conventional triage algorithm can result in all or most fingers of a typical Rake receiver being active, even if only one strong finger is present or needed.

In accordance with aspects of the present disclosure, modifications are made to the conventional 1x triage algorithm to reduce the number of unnecessarily assigned fingers in a Rake receiver whenever possible. The changes relative to the conventional triage algorithm can be generally separated into two categories. The first category relates to the assigning of fingers, and the second category relates to the de-assigning of fingers.

First, the requirements for assignment of fingers in a Rake receiver are made more stringent. In aspects of the disclosure, the threshold for adding a finger may be dynamically changed, in accordance with a detected received signal strength indicator (RSSI) and/or any other suitable measurements of signal quality corresponding to the energy of one or more of the active fingers. Increasing the threshold for adding a finger effectively introduces a penalty to add a new finger. Therefore, by increasing/decreasing the penalty for adding a new finger based on the signal strength detected by the already-active fingers, it can be made harder to add a second finger when the assigned finger already shows good signal strength.

Second, unlike the conventional triage algorithm in a 1x network, an algorithm for de-assigning fingers of a Rake receiver may be implemented. For example, the threshold used for determining if a finger is out of lock may be set to a relatively high level, meaning that the determination that the finger is out of lock can be relatively easy. Furthermore, if the finger is out of lock according to this threshold for greater than a threshold number of iterations, that finger may be de-assigned.

Further to the de-assignment algorithm, it is known in the art that the conventional triage algorithm adds a "virtual path" for every locked path. In an aspect of the de-assignment algorithm, assignment of the virtual path may be avoided in the case that there exists a finger for which the corresponding searcher energy (or signal strength) is greater than a suitable threshold (e.g., about −10 dB or higher).

In various aspects of the disclosure, the thresholds for triggering finger assignment or de-assignment may be determined by any suitable methods. For example, the thresholds may be determined based on legacy parameters sent from a base station (e.g., BS 104). In one aspect of the disclosure, the parameter Pilot Drop Threshold (T_DROP) may be used to determine the suitable assignment and de-assignment thresholds. The parameter T_DROP refers to the pilot strength level below which the mobile station should start the handoff drop timer for pilots in the active set and in the candidate set. This parameter may be used to manage the assignment and de-assignment of the fingers.

Figure 5:
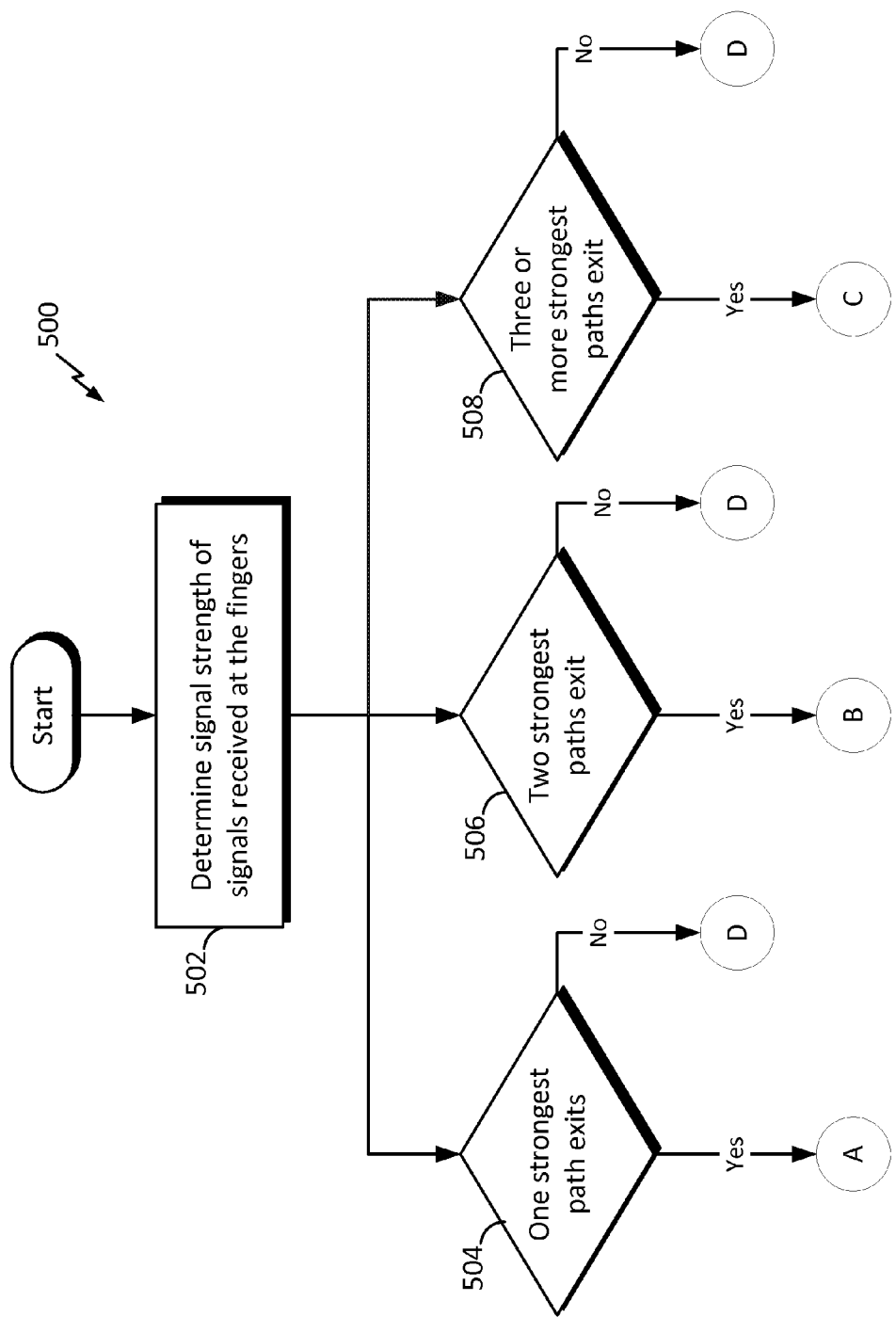
FIGS. 5, 6, and 7 illustrate flowcharts of a finger assignment algorithm in which the threshold for adding a finger is dynamically changed, in accordance with some embodiments.
Figure 6:
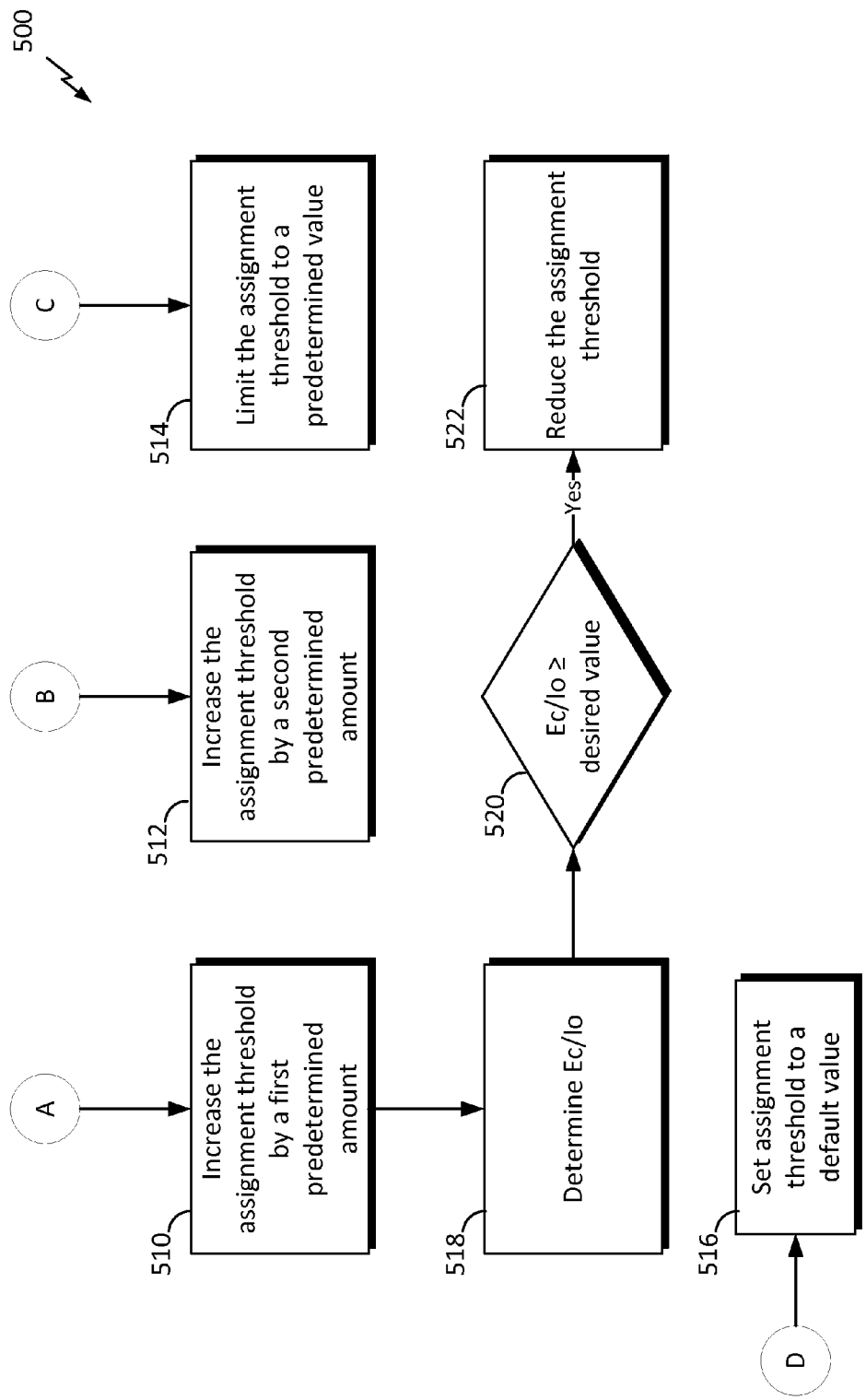
Figure 7:
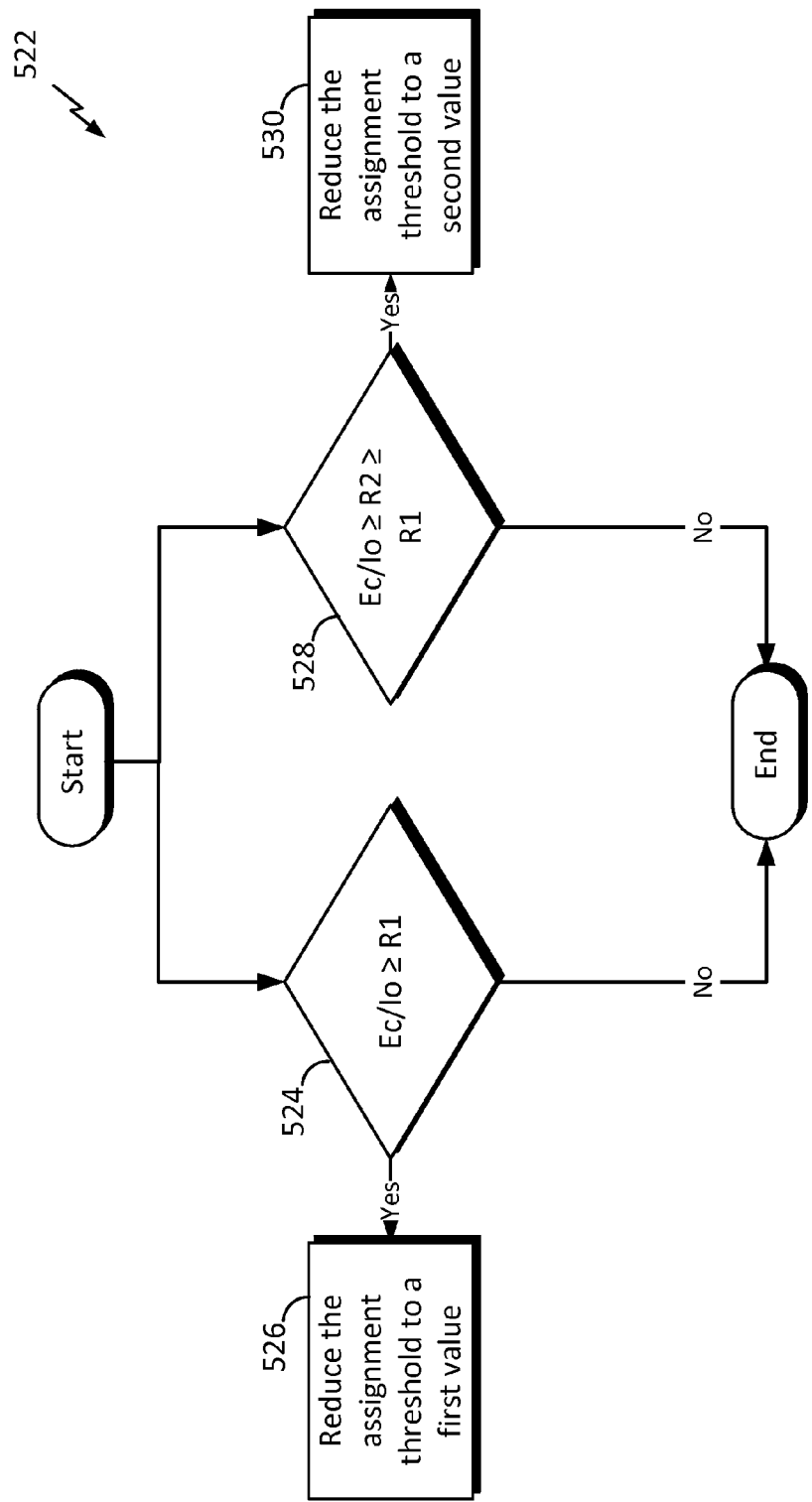

FIGS. 5, 6 and 7 illustrate flowcharts of a finger assignment algorithm 500 in which the threshold for adding a finger is dynamically changed, in accordance with an aspect of the disclosure. The algorithm 500 may be performed at a MS 102 or a BS 104 that is equipped with a Rake receiver 400. In a step 502, the signal strength of the signal received at each active finger is determined. An active finger is a finger that is assigned to receive a particular signal path among the multipath propagation. An inactive finger is a finger that is not assigned to receive a signal. Signal strength may be measured in RSSI or any suitable signal strength measurements. Once the detected signal strength is determined for each active finger (or path), the algorithm 500 can dynamically changes an assignment threshold (e.g., a first threshold) based on the detected signal strength of the active fingers. The assignment threshold is a threshold for determining whether or not an inactive finger is assigned or activated to receive a signal. That is, the assignment threshold determines whether or not an additional path is added or utilized in the Rake receiver.

In a step 504, it is determined whether or not one strongest path exists. In a step 506, it is determined whether or not two strongest paths exist. In a step 508, it is determined whether or not three or more strongest paths exist. A path is referred to as a "strongest path" when a detected signal strength of the path is equal to or greater than a predetermined threshold (e.g., about −10 dB or higher).

If one strongest path exists, the assignment threshold is increased by a first predetermined amount (e.g., 1 dB) in a step 510. In one example, the assignment threshold is increased to −17 dB. If two strongest paths exist, the assignment threshold is increased by a second predetermined amount (e.g., 2 dB) in a step 512. In one example, the assignment threshold is increased to −16 dB. If three or more strongest paths exist, the assignment threshold is limited to a predetermined value (e.g., −16 dB) in a step 514. If no strongest path exists, the assignment threshold is set to a default value (e.g., −18 dB) in a step 516.

In the case when one strongest path exists, the pilot energy-per-chip to spectral density ratio (Ec/Io) is determined for the one strongest path in a step 518. In a step 520, it is determined whether or not the Ec/Io of the one strongest path is equal to or greater than a desired ratio or value. If the determined Ec/Io is equal to or greater than the desired ratio, the assignment threshold is reduced to a suitable value. FIG. 7 is a flowchart illustrating the step 522 in more detail in accordance with an aspect of the disclosure.

Referring to FIG. 7, in a step 524, it is determined whether or not the Ec/Io is equal to or greater than a first ratio R1 (e.g., −9 dB). If the Ec/Io is equal to or greater than the first ratio, the assignment threshold is reduced to a first value (e.g., −16.5 dB) in a step 526. In a step 528, it is determined whether or not the Ec/Io is equal to or greater than a second ratio (e.g., −8 dB). If the Ec/Io is equal to or greater than the second ratio, the assignment threshold is reduced to a second value (e.g., −16 dB). In an aspect of the disclosure, the first ratio R1 is smaller than the second ratio R2. In an aspect of the disclosure, the first value in the step 526 is less than the second value in the step 530. It should be noted that the various values disclosed above in reference to FIGS. 4-7 are illustrative only, and the present disclosure is not limited thereto.

Figure 8:
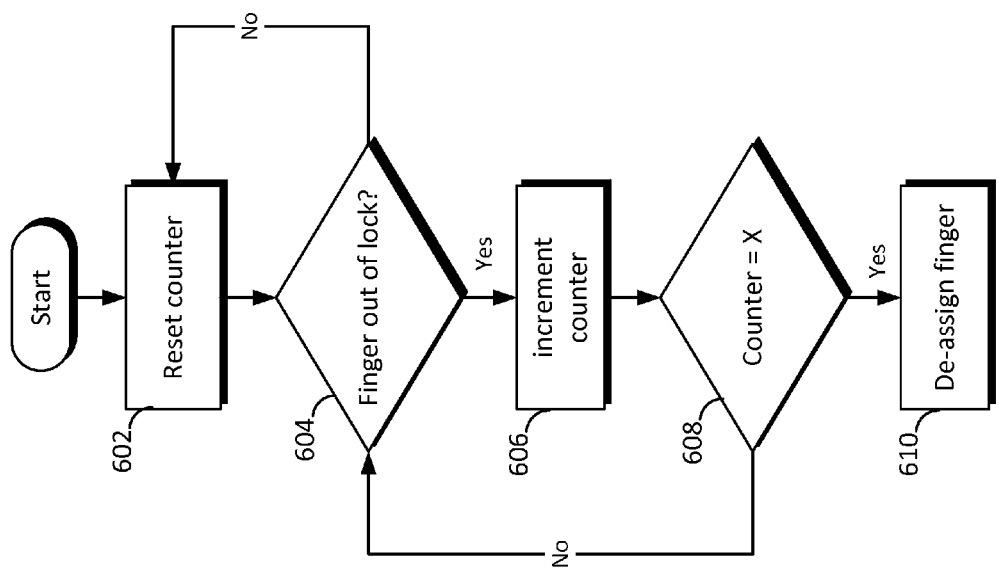
FIG. 8 is a flowchart illustrating an algorithm for de-assigning an active finger of a Rake receiver in accordance with some embodiments.

FIG. 8 is a flowchart illustrating an algorithm 600 for de-assigning an active finger of a Rake receiver in accordance with an aspect of the present disclosure. While running the triage algorithm of the present disclosure, if a finger is out of lock for a certain number X of iterations, the finger can be de-assigned or disabled. A de-assigned finger is not used to receive any signal path. The algorithm 600 may be performed at the Rake receiver 400. In a step 602, a counter is reset (e.g., counter=0). The counter is used to keep track of the number of times a finger is out of lock consecutively. In an aspect of the disclosure, a finger is considered to be out of lock if the signal strength detected by the finger is equal to or less than a de-assignment threshold (e.g., about −23 dB or lower).

For example, the counter may be a counter or register embedded in the processor 304 or a memory location in the memory 305. In a step 604, it is determined whether or not a finger is out of lock (i.e., the Ec/Io falls below the de-assignment threshold (e.g., −23 dB or lower)). If the finger is out of lock, the counter is incremented in a step 606. In a step 608, it is determined whether or not the value of the counter is equal to a desired number X (e.g., 100). If the value of the counter is equal to the desired number X, the finger is de-assigned in a step 610. Referring back to the step 604, if it is determined that the finger is not out of lock, the counter is reset in the step 602.

Figure 9:
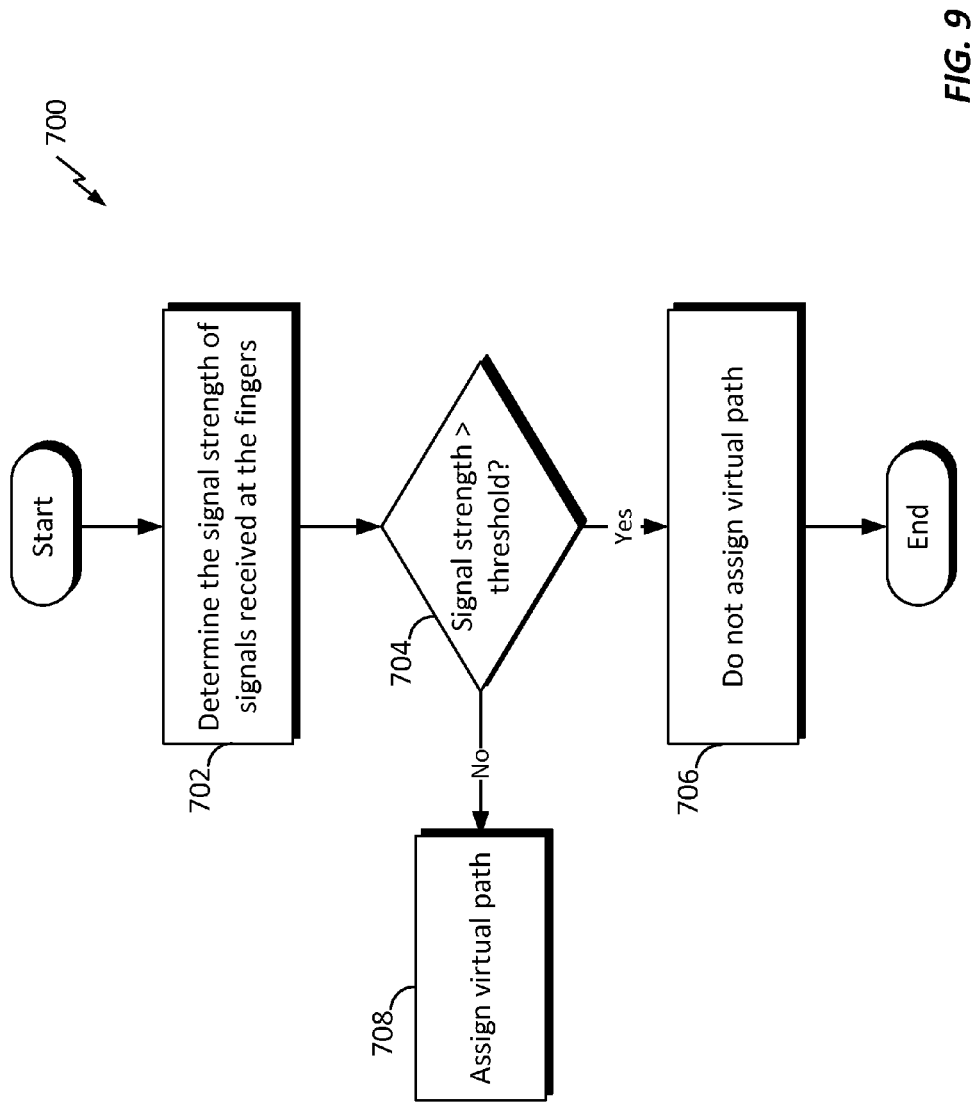
FIG. 9 is a flowchart illustrating an algorithm for assigning virtual paths in accordance with some embodiments.

FIG. 9 is a flowchart illustrating an algorithm 700 for assigning a virtual path in accordance with an aspect of the present disclosure. In the conventional art, a virtual path is added per every locked path. However, a virtual path is selectively added in accordance with the algorithm 700. The algorithm 700 may be performed at the Rake receiver 400. In a step 702, the energy or signal strength of the signal detected by each finger is determined. The signal strength may be measured in RSSI. In an aspect of the disclosure, the step 702 and the step 502 may be the same. In a step 704, it is determined whether or not the signal strength detected by any finger is greater than a predetermined threshold (e.g., about −10 dB or higher). If there exists a finger for which the detected signal strength is better than the predetermined threshold, no virtual path will be assigned in a step 706. However, if no finger detects a signal strength better than the predetermined threshold, a virtual path will be assigned to each locked path in a step 708.

Figure 10:
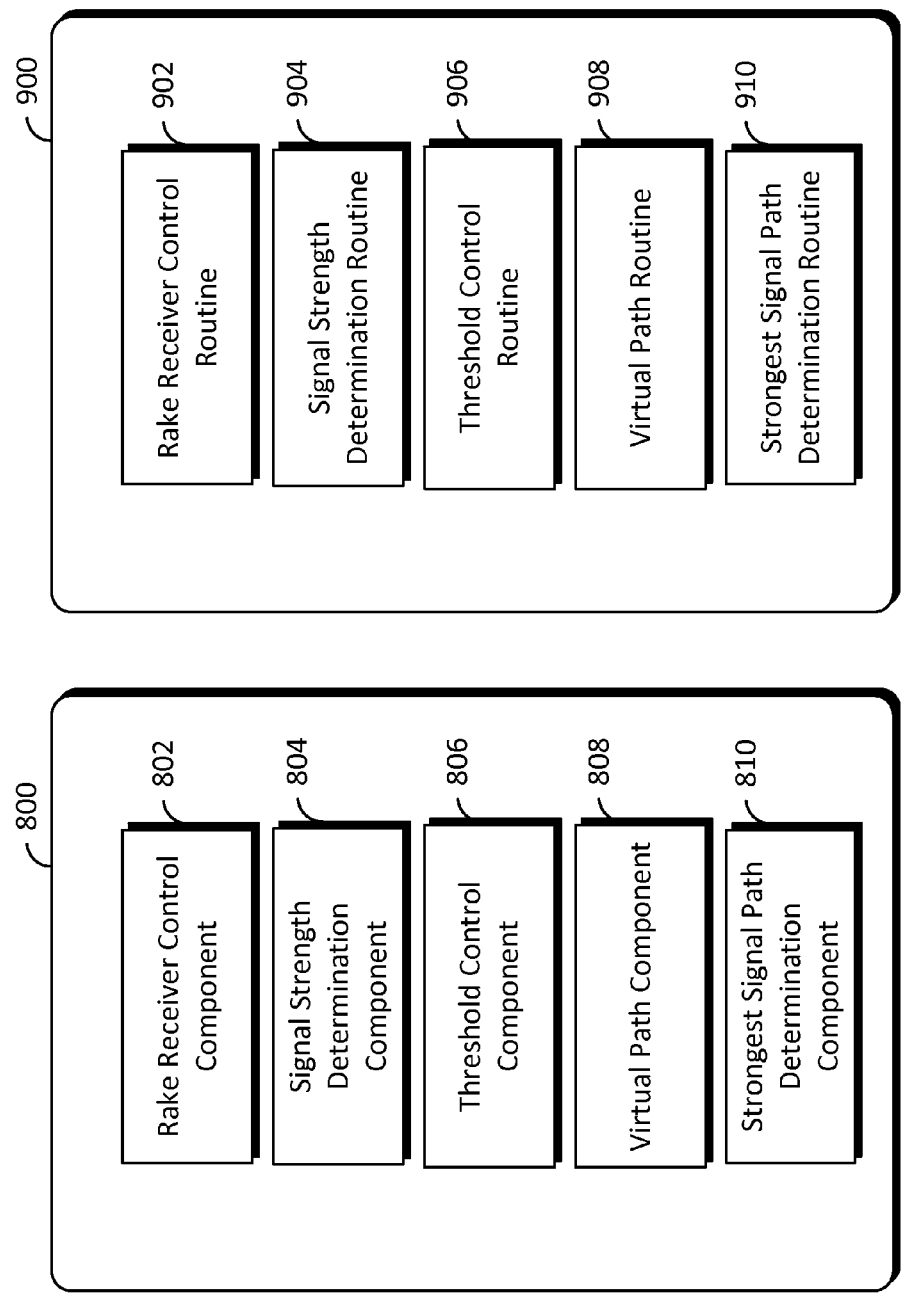
FIG. 10 is a conceptual diagram illustrating a processor and a computer-readable medium configured to perform the algorithms of FIGS. 5-9 in accordance with some embodiments.

FIG. 10 is a conceptual diagram illustrating a processor 800 and a computer-readable medium 900 configurable to perform the algorithms 500, 600, and 700 in accordance with aspects of the disclosure. The processor 800 may be used as the processor 304, and the computer-readable medium 900 may be used as the computer-readable medium 306 (shown in FIG. 3) in accordance with an aspect of the disclosure. The processor 800 includes various components together with the software routines stored in the computer-readable medium 900, can perform the various algorithms and methods disclosed in reference to FIGS. 1-9.

In one aspect of the disclosure, the processor 800 includes a Rake receiver control component 802, a signal strength determination component 804, a threshold control component 806, a virtual path component 808, and a strongest signal path determination component 810. In one aspect of the disclosure, the computer-readable medium 900 includes a Rake receiver control routine 902, a signal strength determination routine 904, a threshold control routine 906, a virtual path routine 908, and a strongest signal path determination routine 910. These components of the processor 800 and routines of the computer-readable medium 900 may be utilized to perform the algorithms 500, 600, and 700.

The Rake receiver control component 802 and Rake receiver control routine 902 can be configured to perform the finger assignment and de-assignment of a Rake receiver 400. The signal strength determination component 804 and signal strength determination routine 904 can be configured to perform the measurements (e.g., RSSI and Ec/Io) of the signals received by the fingers of the Rake receiver 400. The threshold control component 806 and threshold control routine 906 can be configured to adjust various thresholds (e.g., assignment threshold, de-assignment threshold, etc.) utilized in the algorithms 500, 600, and 700. The virtual path component 808 and virtual path routine 908 can be configured to perform the virtual path assignment in accordance with the algorithms 500, 600, and 700. The strongest signal path determination component 810 and strongest signal path determination routine 910 can be configured to determine which signal path received by the Rake receiver 400 is a strongest signal path that has a signal strength equal to or greater than a predetermined threshold (e.g., about −10 dB or higher).

Figure 11:
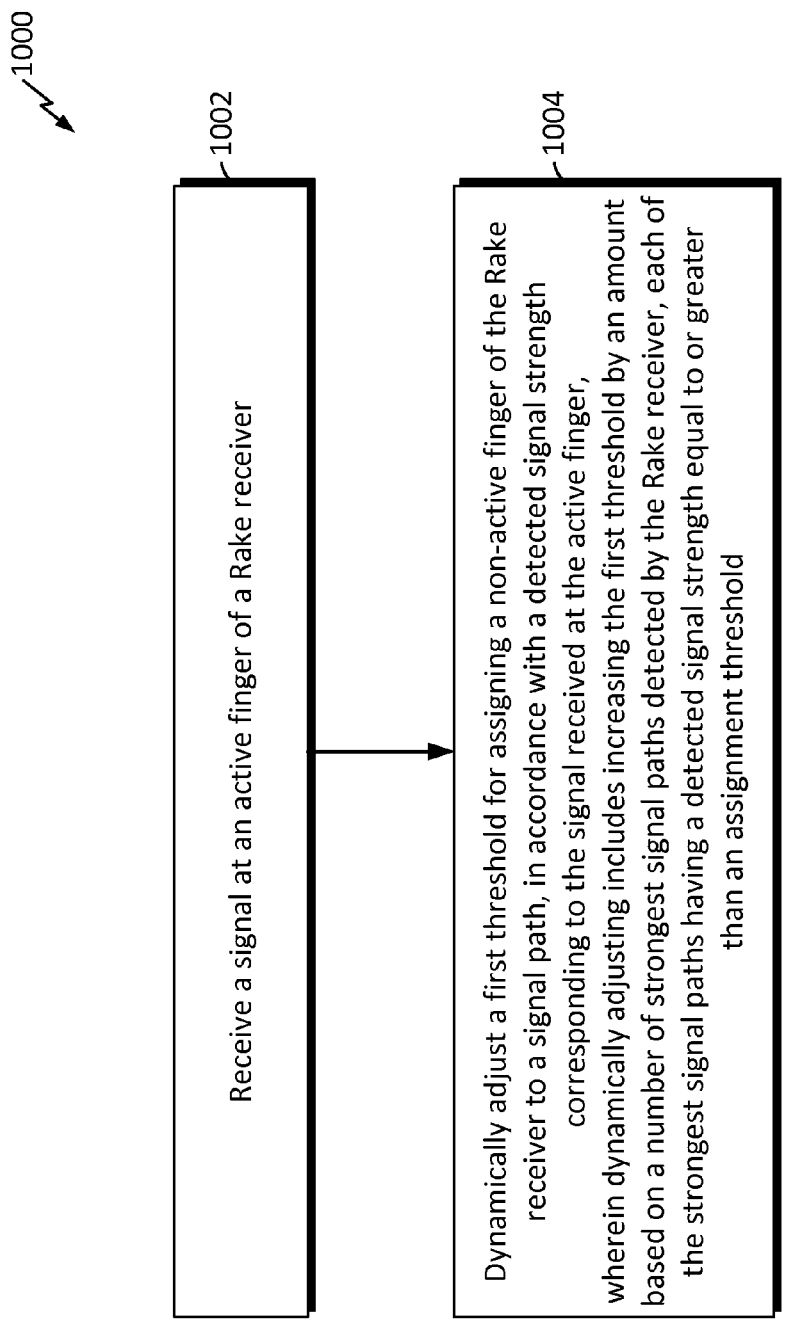
FIG. 11 is a flowchart illustrating a method for controlling a finger lock state of a Rake receiver in accordance with some embodiments.

FIG. 11 is a flowchart illustrating a method 1000 for controlling a finger lock state of a Rake receiver in accordance with an aspect of the disclosure. This method 1000 may be performed in accordance with the algorithms 500, 600, and 700 using the Rake receiver 400. In accordance with the method 1000, a signal is received at an active finger of a Rake receiver in a step 1002. Then, in a step 1004, the method dynamically adjusts a first threshold for assigning a non-active finger of the Rake receiver to a signal path, in accordance with a detected signal strength corresponding to the signal received at the active finger. Here, the first threshold is increased by an amount based on a number of strongest signal paths detected by the Rake receiver, each of the strongest signal paths having a detected signal strength equal to or greater than an assignment threshold (e.g., about −10 dB or higher).

Several aspects of a telecommunications system have been presented with reference to an IS-2000 1x system. As those skilled in the art will readily appreciate, various aspects described throughout this disclosure may be extended to other telecommunication systems, network architectures and communication standards.

By way of example, various aspects may be extended to UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communications, comprising:
receiving a signal at an active finger of a Rake receiver; and
dynamically adjusting a first threshold for assigning a non-active finger of the Rake receiver to a signal path, in accordance with a detected signal strength of the signal received at the active finger,
wherein dynamically adjusting comprises increasing the first threshold by an amount based on a number of strongest signal paths detected by the Rake receiver, each of the strongest signal paths having a detected signal strength equal to or greater than an assignment threshold.

2. The method of claim 1, further comprising if no signal path having a signal strength equal to or greater than the assignment threshold is detected by the Rake receiver, setting the first threshold to a default value.

3. The method of claim 1, wherein the detected signal strength comprises a received signal strength indicator (RSSI).

4. The method of claim 3, wherein the assignment threshold is about −10 dB.

5. The method of claim 1, further comprising: de-assigning the active finger of the Rake receiver in accordance with a determination that a detected signal strength corresponding to a signal received at the active finger is less than a de-assignment threshold for greater than a predetermined number of iterations.

6. The method of claim 5, wherein the de-assignment threshold is about −23 dB.

7. The method of claim 1, further comprising: forgoing to assign a virtual path corresponding to a locked path if any finger of the Rake receiver detects a signal strength greater than a third threshold.

8. The method of claim 1,
wherein the first threshold is increased by a first amount if the number of strongest signal paths is equal to one, and the first threshold is increased by a second amount if the number of strongest signal paths is equal to two or more, and
wherein the first amount is less than the second amount.

9. The method of claim 8, further comprising if the number of strongest signal paths is equal to three or more, limiting the first threshold to a predetermined level.

10. The method of claim 1, further comprising
if the number of strongest signal paths is equal to one, and if at least one finger of the Rake receiver detects a pilot energy-per-chip to spectral density ratio (Ec/Io) that is equal to or greater than a third threshold,
reducing the first threshold by an amount based on a difference between the Ec/Io and the third threshold.

11. An apparatus, comprising:
a Rake receiver; and
means for dynamically adjusting a first threshold for assigning a non-active finger of the Rake receiver to a signal path, in accordance with a detected signal strength of a signal received at an active finger of the Rake receiver,
wherein the means for dynamically adjusting comprises means for increasing the first threshold by an amount based on a number of strongest signal paths detected by the Rake receiver, each of the strongest signal paths having a detected signal strength equal to or greater than an assignment threshold.

12. The apparatus of claim 11, further comprising if no signal path having a signal strength equal to or greater than the assignment threshold is detected by the Rake receiver, means for setting the first threshold to a default value.

13. The apparatus of claim 11, wherein the detected signal strength comprises a received signal strength indicator (RSSI).

14. The apparatus of claim 13, wherein the assignment threshold is about −10 dB.

15. The apparatus of claim 11, further comprising: means for de-assigning the active finger of the Rake receiver in accordance with a determination that a detected signal strength corresponding to a signal received at the active finger is less than a de-assignment threshold for greater than a predetermined number of iterations.

16. The apparatus of claim 15, wherein the de-assignment threshold is about −23 dB.

17. The apparatus of claim 11, further comprising: means for forgoing to assign a virtual path corresponding to a locked path if any finger of the Rake receiver detects a signal strength greater than a third threshold.

18. The apparatus of claim 11,
wherein the first threshold is increased by a first amount if the number of strongest signal paths is equal to one, and the first threshold is increased by a second amount if the number of strongest signal paths is equal to two or more, and
wherein the first amount is less than the second amount.

19. The apparatus of claim 18, further comprising if the number of strongest signal paths is equal to three or more, means for limiting the first threshold to a predetermined level.

20. The apparatus of claim 11, further comprising
if the number of strongest signal paths is equal to one, and if at least one finger of the Rake receiver detects a pilot energy-per-chip to spectral density ratio (Ec/Io) that is equal to or greater than a third threshold,
means for reducing the first threshold by an amount based on a difference between the Ec/Io and the third threshold.

21. A computer program product comprising
a computer-readable medium comprising code for:
receiving a signal at an active finger of a Rake receiver; and
dynamically adjusting a first threshold for assigning a non-active finger of the Rake receiver to a signal path, in accordance with a detected signal strength of the signal received at the active finger of the Rake receiver,
wherein dynamically adjusting comprises increasing the first threshold by an amount based on a number of strongest signal paths detected by the Rake receiver, each of the strongest signal paths having a detected signal strength equal to or greater than an assignment threshold.

22. The computer program product of claim 21, further comprising if no signal path having a signal strength equal to or greater than the assignment threshold is detected by the Rake receiver, code for setting the first threshold to a default value.

23. The computer program product of claim 21, wherein the detected signal strength comprises a received signal strength indicator (RSSI).

24. The computer program product of claim 23, wherein the assignment threshold is about −10 dB.

25. The computer program product of claim 21, further comprising code for:
de-assigning the active finger of the Rake receiver in accordance with a determination that a detected signal strength corresponding to a signal received at the active finger is less than a de-assignment threshold for greater than a predetermined number of iterations.

26. The computer program product of claim 25, wherein the de-assignment threshold is about −23 dB.

27. The computer program product of claim 21, further comprising code for:
forgoing to assign a virtual path corresponding to a locked path if any finger of the Rake receiver detects a signal strength greater than a third threshold.

28. The computer program product of claim 21,
wherein the first threshold is increased by a first amount if the number of strongest signal paths is equal to one, and the first threshold is increased by a second amount if the number of strongest signal paths is equal to two or more, and
wherein the first amount is less than the second amount.

29. The computer program product of claim 28, further comprising if the number of strongest signal paths is equal to three or more, code for limiting the first threshold to a predetermined level.

30. The computer program product of claim 21, further comprising
if the number of strongest signal paths is equal to one, and if at least one finger of the Rake receiver detects a pilot energy-per-chip to spectral density ratio (Ec/Io) that is equal to or greater than a third threshold,
code for reducing the first threshold by an amount based on a difference between the Ec/Io and the third threshold.

31. An apparatus, comprising:
at least one processor;
a communication interface coupled to the at least one processor, the communication interface comprising a Rake receiver; and
a memory coupled to the at least one processor,
wherein the at least one processor is configured to:
receive a signal at an active finger of the Rake receiver; and
dynamically adjust a first threshold for assigning a non-active finger of the Rake receiver to a signal path, in accordance with a detected signal strength of the signal received at the active finger of the Rake receiver,
wherein dynamically adjusting comprises increasing the first threshold by an amount based on a number of strongest signal paths detected by the Rake receiver, each of the strongest signal paths having a detected signal strength equal to or greater than an assignment threshold.

32. The apparatus of claim 31, wherein the at least one processor is further configured to if no signal path having a signal strength equal to or greater than the assignment threshold is detected by the Rake receiver, set the first threshold to a default value.

33. The apparatus of claim 31, wherein the detected signal strength comprises a received signal strength indicator (RSSI).

34. The apparatus of claim 33, wherein the assignment threshold is about −10 dB.

35. The apparatus of claim 31, wherein the at least one processor is further configured to:

de-assign the active finger of the Rake receiver in accordance with a determination that a detected signal strength corresponding to a signal received at the active finger is less than a de-assignment threshold for greater than a predetermined number of iterations.

36. The apparatus of claim 35, wherein the de-assignment threshold is about −23 dB.

37. The apparatus of claim 31, wherein the at least one processor is further configured to:

forgo to assign a virtual path corresponding to a locked path if any finger of the Rake receiver detects a signal strength greater than a third threshold.

38. The apparatus of claim 31, wherein the first threshold is increased by a first amount if the number of strongest signal paths is equal to one, and the first threshold is increased by a second amount if the number of strongest signal paths is equal to two or more, and wherein the first amount is less than the second amount.

39. The apparatus of claim 38, wherein the at least one processor is further configured to if the number of strongest signal paths is equal to three or more, limit the first threshold to a predetermined level.

40. The apparatus of claim 31, wherein the at least one processor is further configured to if the number of strongest signal paths is equal to one, and if at least one finger of the Rake receiver detects a pilot energy-per-chip to spectral density ratio (Ec/Io) that is equal to or greater than a third threshold, reduce the first threshold by an amount based on a difference between the Ec/Io and the third threshold.

* * * * *